United States Patent
Shoen

(10) Patent No.: US 7,182,375 B1
(45) Date of Patent: Feb. 27, 2007

(54) FENDER WITH INDICIUM

(75) Inventor: Mark Vincent Shoen, Phoenix, AZ (US)

(73) Assignee: U-Haul International, Inc., Phoenix, AZ (US)

( * ) Notice: Subject to any disclaimer, the term of this patent is extended or adjusted under 35 U.S.C. 154(b) by 820 days.

(21) Appl. No.: 09/557,459

(22) Filed: Apr. 24, 2000

Related U.S. Application Data

(63) Continuation-in-part of application No. 09/193,010, filed on Nov. 16, 1998, now Pat. No. 6,678,981.

(51) Int. Cl.
*B60R 19/00* (2006.01)
*B62D 25/16* (2006.01)
*F21V 33/00* (2006.01)

(52) U.S. Cl. .......................... 293/1; 280/847; 293/102; 293/58; 362/506; 296/198

(58) Field of Classification Search ............... 362/459, 362/506; 296/198, 181; 280/402, 489, 400, 280/414.1
See application file for complete search history.

(56) References Cited

U.S. PATENT DOCUMENTS

| | | | | |
|---|---|---|---|---|
| 883,710 | A | * | 4/1908 | Frentzen ..................... 280/848 |
| 1,440,516 | A | * | 1/1923 | Whitton ..................... 180/69.2 |
| 1,877,792 | A | | 9/1932 | Bell ........................... 362/506 |
| 2,001,705 | A | | 5/1935 | Caponi ...................... 362/540 |
| 2,914,341 | A | | 11/1959 | Martt ......................... 280/152 |
| 3,731,831 | A | * | 5/1973 | Huff ........................... 214/506 |
| 3,801,132 | A | * | 4/1974 | Haynie et al. ............... 280/404 |
| 3,817,556 | A | * | 6/1974 | Nyman ........................ 280/400 |
| 3,831,018 | A | * | 8/1974 | Weber ......................... 240/8.2 |
| 3,887,208 | A | * | 6/1975 | Vidal .......................... 280/648 |
| 3,941,994 | A | | 3/1976 | Petty et al. ................. 362/506 |
| 4,027,808 | A | * | 6/1977 | Hardwick ................... 214/313 |
| 4,340,124 | A | * | 7/1982 | Leonard ..................... 180/208 |
| 4,395,749 | A | * | 7/1983 | Poveromo .................... 362/83 |
| 4,422,664 | A | * | 12/1983 | Poveromo ................ 280/414.1 |
| 4,986,571 | A | | 1/1991 | Godbersen .................. 280/854 |
| 5,082,307 | A | * | 1/1992 | Hollingworth, Jr. ......... 280/699 |
| 5,171,037 | A | | 12/1992 | Thompson et al. .......... 280/770 |
| 5,183,293 | A | * | 2/1993 | Julian ......................... 280/430 |
| 5,342,162 | A | * | 8/1994 | Robinette et al. ........... 414/483 |
| 5,380,143 | A | * | 1/1995 | Mohan ........................ 414/495 |
| 5,415,516 | A | * | 5/1995 | Richards ..................... 414/458 |

(Continued)

FOREIGN PATENT DOCUMENTS

JP          359149834 A  *  8/1984

(Continued)

*Primary Examiner*—Lesley D. Morris
*Assistant Examiner*—Daniel Yeagley
(74) *Attorney, Agent, or Firm*—Richard E. Oney; Tiffany & Bosco, P.A.

(57) ABSTRACT

Disclosed is a fender including an offset light housing installed on a trailer or tow dolly for towing a vehicle or other piece of equipment. In a preferred embodiment the fender further includes a clearance increasing portion. The fenders minimize the possibility of damage to the vehicle or other piece of equipment. Also disclosed is a tow dolly including a tire platform that is positioned such that when an automobile is placed on the tow dolly, the axle of the automobile is positioned forwardly of the front-most axle of the tow dolly.

13 Claims, 10 Drawing Sheets

U.S. PATENT DOCUMENTS

| | | | | |
|---|---|---|---|---|
| 5,480,174 A | | 1/1996 | Grenier | 280/414.1 |
| D369,328 S | * | 4/1996 | Acosta | D12/101 |
| 5,570,898 A | * | 11/1996 | Albert | 280/656 |
| D389,786 S | * | 1/1998 | McCullum et al. | D12/106 |

FOREIGN PATENT DOCUMENTS

| | | | |
|---|---|---|---|
| JP | 09030451 A | * | 2/1997 |
| JP | 11310159 A | * | 4/1998 |
| JP | 2000016365 A | * | 7/1998 |

* cited by examiner

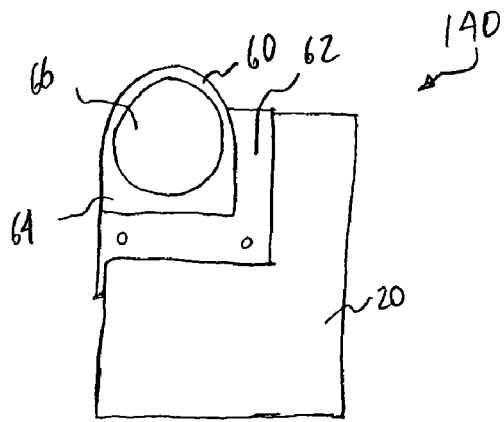
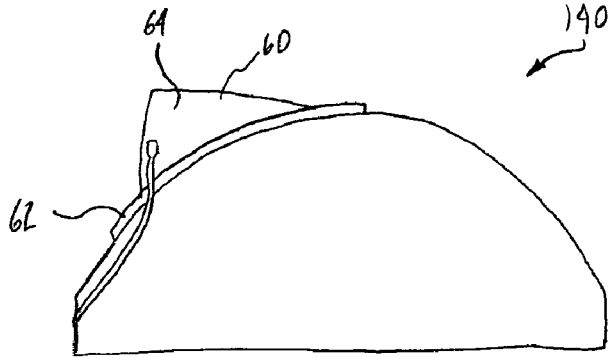
FIG. 13  FIG. 14
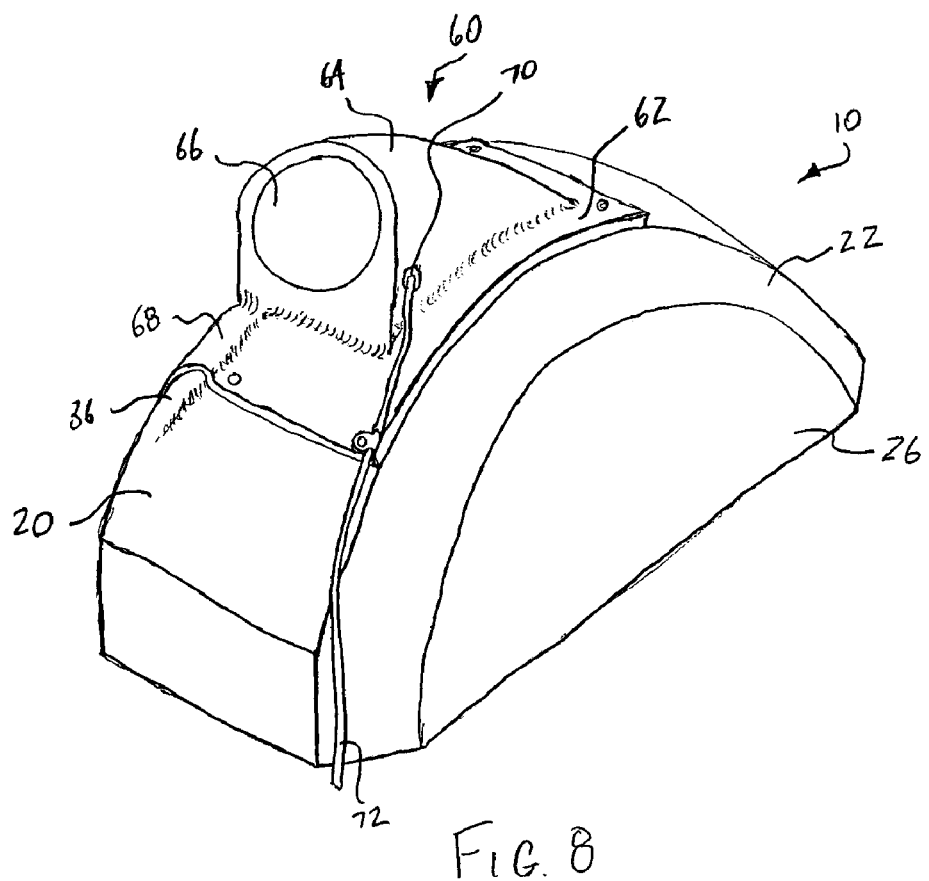
FIG. 8

FENDER WITH INDICIUM

This application is a continuation-in-part of application Ser. No. 09/193,010, filed Nov. 16, 1998 now U.S. Pat. No. 6,678,981, the entirety of which is incorporated herein by reference.

FIELD OF THE INVENTION

The present invention relates to trailer and tow dolly fenders and more particularly to a trailer and tow dolly fender having an offset light housing.

BACKGROUND OF THE INVENTION

Trailers and tow dollies typically include two or more conventional fenders that have a substantially convex or square cornered shape. Objects, for example, an automobile, that fit between the fenders can only be a limited width and still fit thereon. An automobile typically has a convex side profile. A light housing mounted on the fender or the top inner corner of a conventional fender come into the closest proximity with the side of the automobile. If the automobile exceeds the maximum allowable width between the light housings mounted on the fenders it cannot fit onto the trailer or tow dolly, and therefore must be placed on a wider trailer or tow dolly to be towed. However, wider trailers or tow dollies are larger, heavier and more expensive. Also, a wider trailer or tow dolly may not be available if the overall width of the first trailer or tow dolly was already the maximum allowable by law.

While trailers typically carry the entire weight of a vehicle-in-tow by supporting both axles away from contact with the road surface, tow dollies support only one axle, leaving the tires of the second axle in contact with the road surface whereby the tow dolly does not carry the portion of vehicle weight apportioned to that axle. These tow dollies include a platform mounted on an axle on which the front (or rear) wheels of a vehicle to be towed are mounted. A pair of loading ramps extend from the platform for driving the front (or rear) wheels of the vehicle onto the platform. The tongue of the tow dolly extends forwardly of the axle and the platform to the towing vehicle. The towing vehicle and tow dolly are typically connected via a hitchball coupler. When a vehicle is loaded on the tow dolly, the platform is constructed such that the axle of the vehicle is located forward of the axle of the tow dolly, relative to the forward towing direction. This transfers a portion of the weight of the vehicle to be towed, with the axle acting as a fulcrum, and a resulting downward force component acting through the hitchball coupler. Such force is desirable and can beneficially affect handling of the towing vehicle/vehicle-in-tow combination.

As illustrated in FIGS. 1–2, tow dollies, which support only one axle of a vehicle-in-tow, have a great need of clearance between the body of the vehicle-in-tow and the tow dolly fender/light housing, because of lateral angular movement of the vehicle-in-tow (and the platform to which it is affixed) that is typical during turning maneuvers. This movement swings the vehicle-in-tow into closer proximity to the tow dolly fender and light housing. FIG. 1 shows a top plan view of a typical tow dolly 1 having two fenders 2, two ramps 3, an axle 4, a tongue 5 and a platform 6 extending between the fenders 2. During a turning maneuver, as shown in FIG. 2, the platform 6 and the vehicle-in-tow (not shown, however, the ovals on the platform 6 represent tire placement) thereon pivot. This causes the body of the vehicle to come into closer proximity or contact with the fender.

A long felt need exists for a fender design that increases the width of the load able to be carried thereon without increasing the overall width of the trailer or tow dolly. A further need exists for a tow dolly wherein an increased portion of the weight of the vehicle to be towed is distributed to the hitchball coupler, and, therefore, the towing vehicle for improved handling.

SUMMARY OF THE PREFERRED EMBODIMENTS

In accordance with one aspect of the present invention, there is provided a fender having an offset light housing.

In preferred embodiments the fender defines a midline, with respect to which the light housing is offset and the fender includes a clearance increasing portion.

In another preferred embodiment, the fender includes a top portion to which the light housing is attached, with the clearance increasing portion extending from the top portion at a non-zero acute angle.

In another preferred embodiment, the clearance increasing portion is concave.

In additional preferred embodiments, the top portion is curved in a longitudinal direction and the angle at which the clearance increasing portion extends from the top portion is between about 30° and 60°. Also, the fender includes an inner wall that extends from the clearance increasing portion and an outer wall that extends from the outer edge of the top portion.

In additional preferred embodiments, the top portion includes a substantially flat middle section and two curved end sections, or the top portion includes a plurality of planar sections.

In accordance with another aspect of the present invention, there is provided a combination of a trailer and at least one fender having an offset light housing.

In accordance with another aspect of the present invention, there is provided a tow dolly including one or more axles each having two wheels rotatably mounted at opposite ends thereof, two fenders including an offset light housing and a clearance increasing portion, a tongue extending forwardly from the forward-most axle, and a platform mounted on the axle. Each fender partially surrounds one of the wheels. In a preferred embodiment, the platform is positioned such that when a vehicle to be towed is mounted on the trailer, a front axle of the vehicle to be towed is positioned forwardly of the forward-most axle of the trailer.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which

FIG. 8 is a perspective view of a fender including an offset light housing and a clearance increasing portion secured thereon in accordance with a first embodiment of the present invention.

FIG. 13 is a rear elevation of a fender including an offset light housing in accordance with a third embodiment of the present invention.

FIG. 14 is a side elevation of the fender and offset light housing of FIG. 13.

Like numerals refer to like parts throughout the several views of the drawings.

DETAILED DESCRIPTION OF THE PREFERRED EMBODIMENTS

Figure 1:
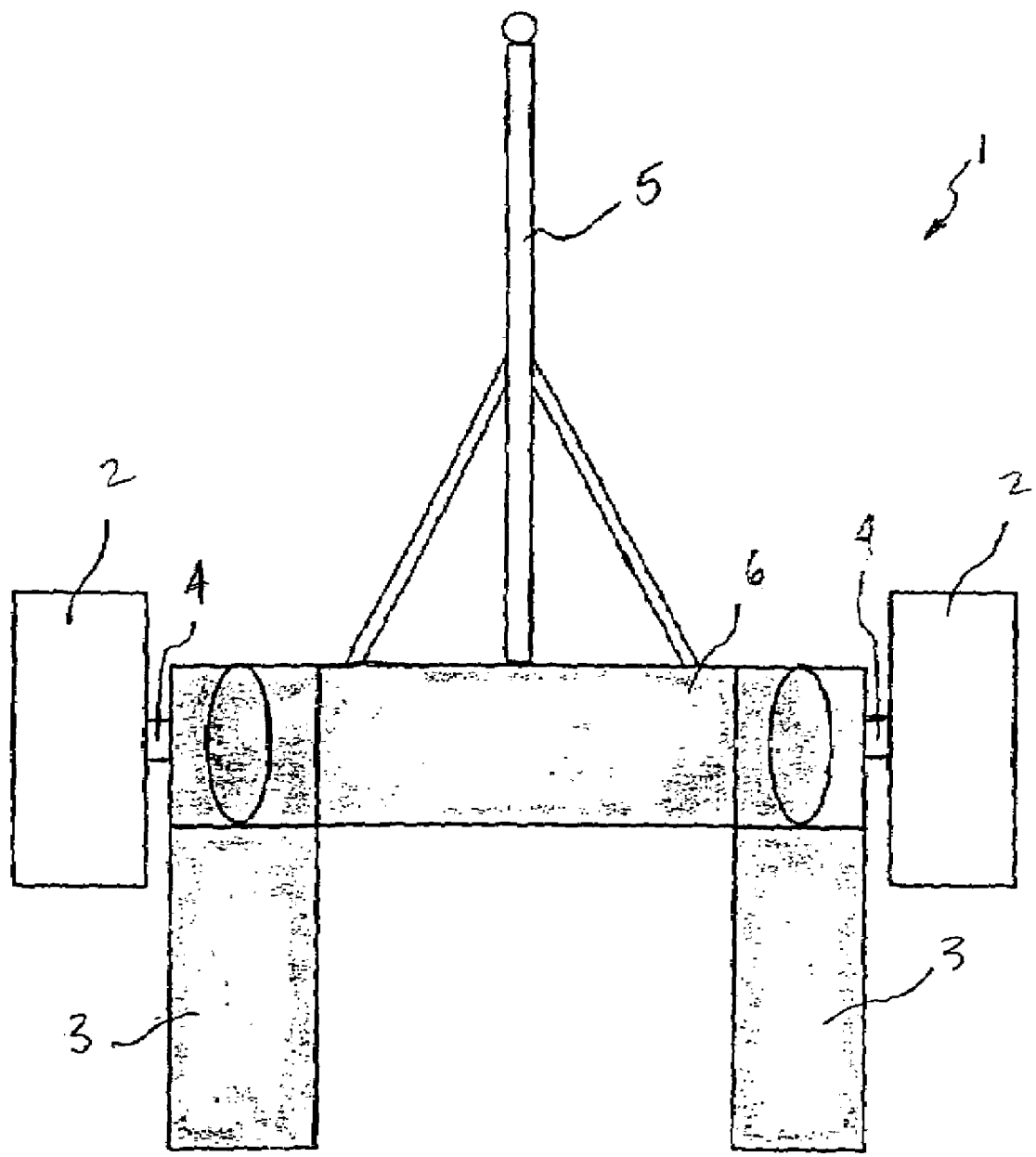
FIG. 1 is a top view of a typical prior art tow dolly having one axle.
Figure 2:
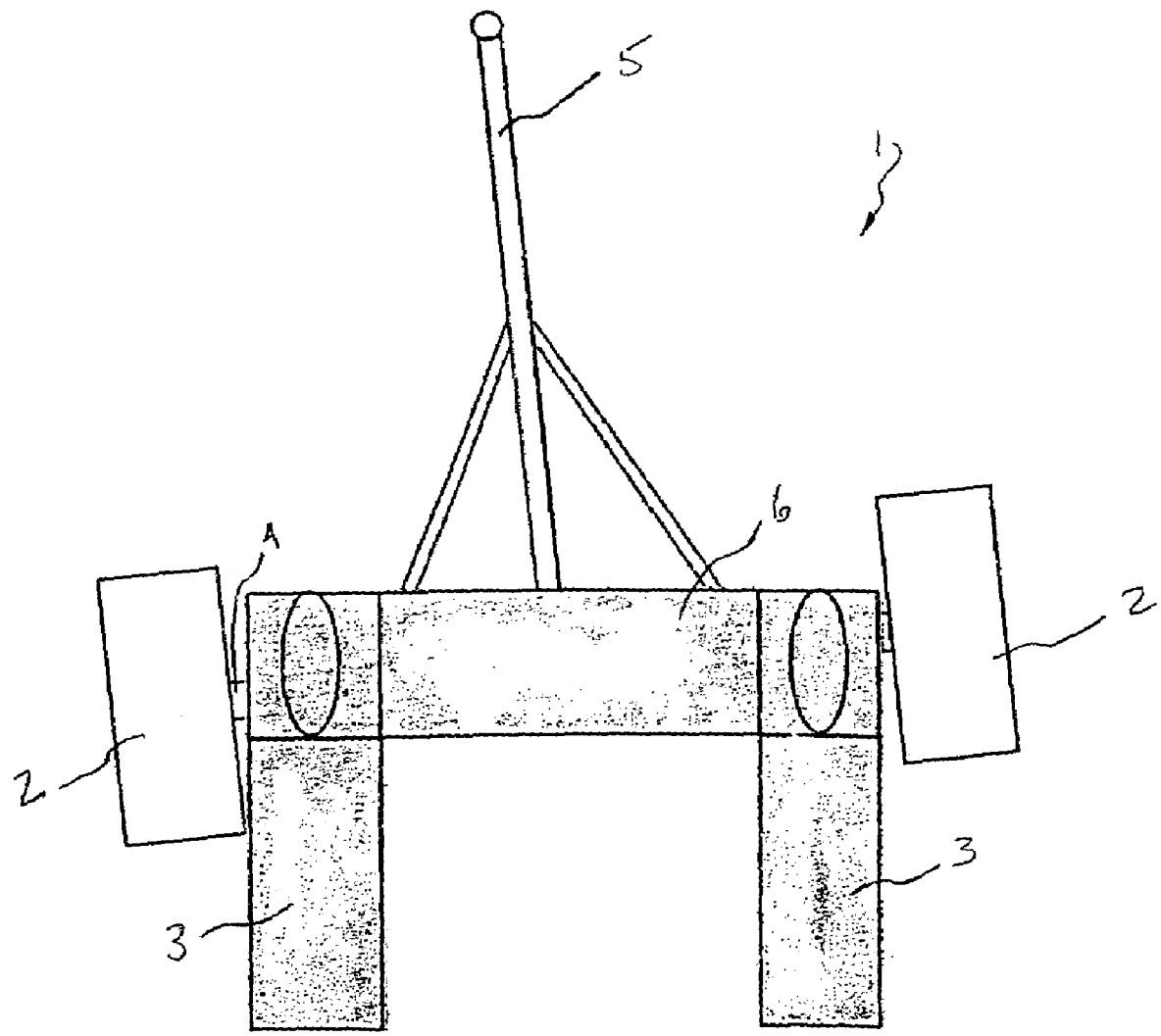
FIG. 2 is a top view of the tow dolly of FIG. 1 showing the angular movement of the platform during a turning maneuver.
Figure 3:
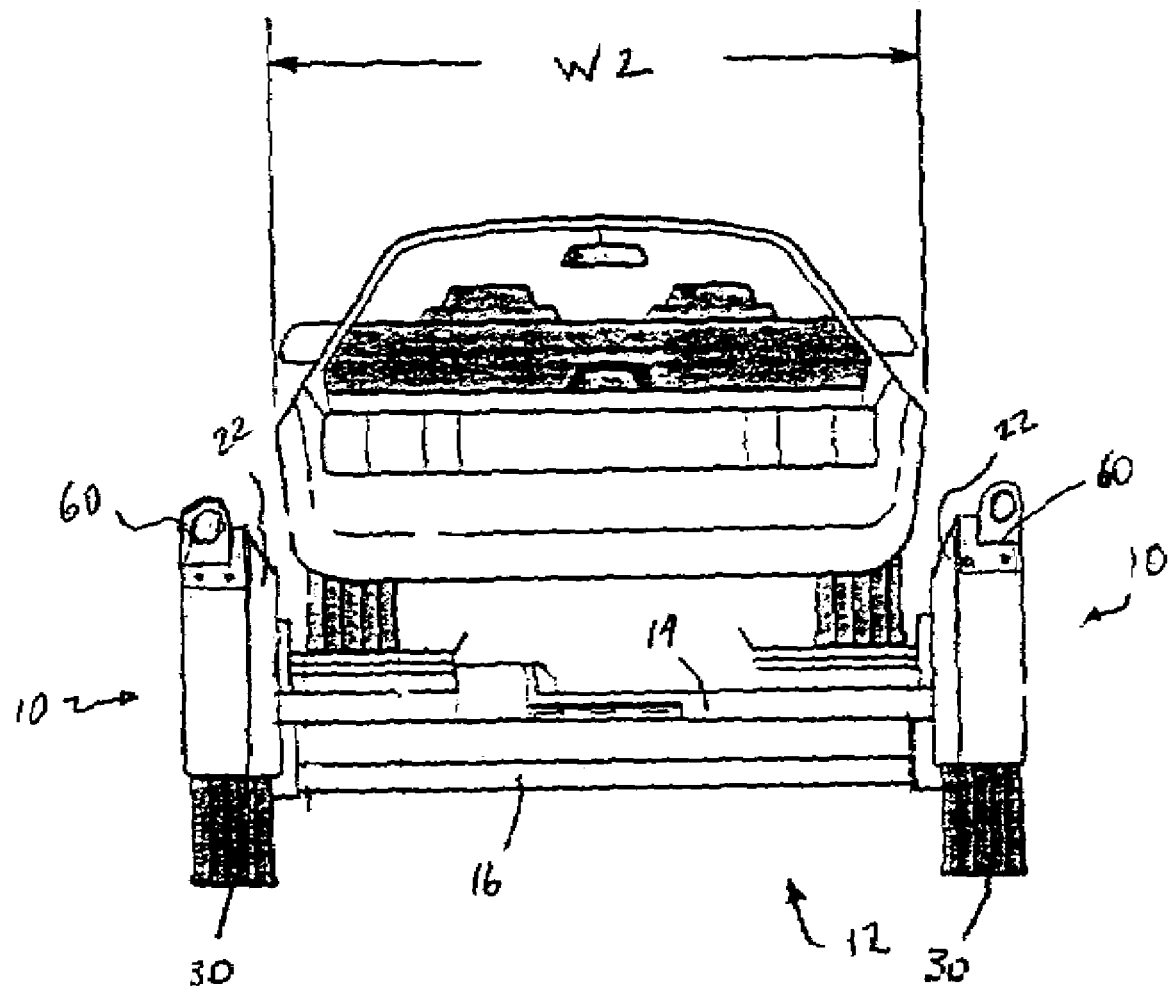
FIG. 3 is a rear view of an auto trailer having two fenders which each include an offset light housing and a clearance increasing portion in accordance with a first embodiment of the present invention.

Referring to FIG. 3, an auto trailer 12 having two beveled edge fenders 10 that each include an offset light housing 60 according to a first embodiment of the invention is shown. Conventional fender shapes and designs are well known in the art. It should be understood that the fender design to which is added an offset light housing (as described herein) is not meant to be a limitation on the present invention.

It will be appreciated that terms such as "forward," "above," "forwardly" and other positionally descriptive terms used hereinbelow are used merely for ease of description and refer to the orientation of the components as shown in the Figures.

It should be understood that any orientation of the elements described herein is within the scope of the present invention.

As illustrated herein, the fender is provided in combination with a tow dolly for towing objects, such as automobiles. However, neither the type of trailer or tow dolly nor the object which can be towed thereon is meant to be a limitation on the present invention. The fender can be used on trailers having any number of wheels or axles. The fender can be used on trailers or tow dollies provided for towing automobiles, trucks, boats, motorcycles, personal watercraft, heavy equipment, motor homes, etc.

The conventional auto trailer 12 includes a frame 14 having at least one axle 16 with wheels 18 and tires 30 mounted thereon rotatably mounted at opposite ends of axle 16. Fenders 10 are secured to the frame 14 and over the tires 30 by a conventional method, such as welding or securing means, such as threaded fasteners, rivets or the like. The fenders 10 also can be integral with the trailer. It should be understood that a right-side fender is typically a mirror image of a left-side fender.

Figure 7:
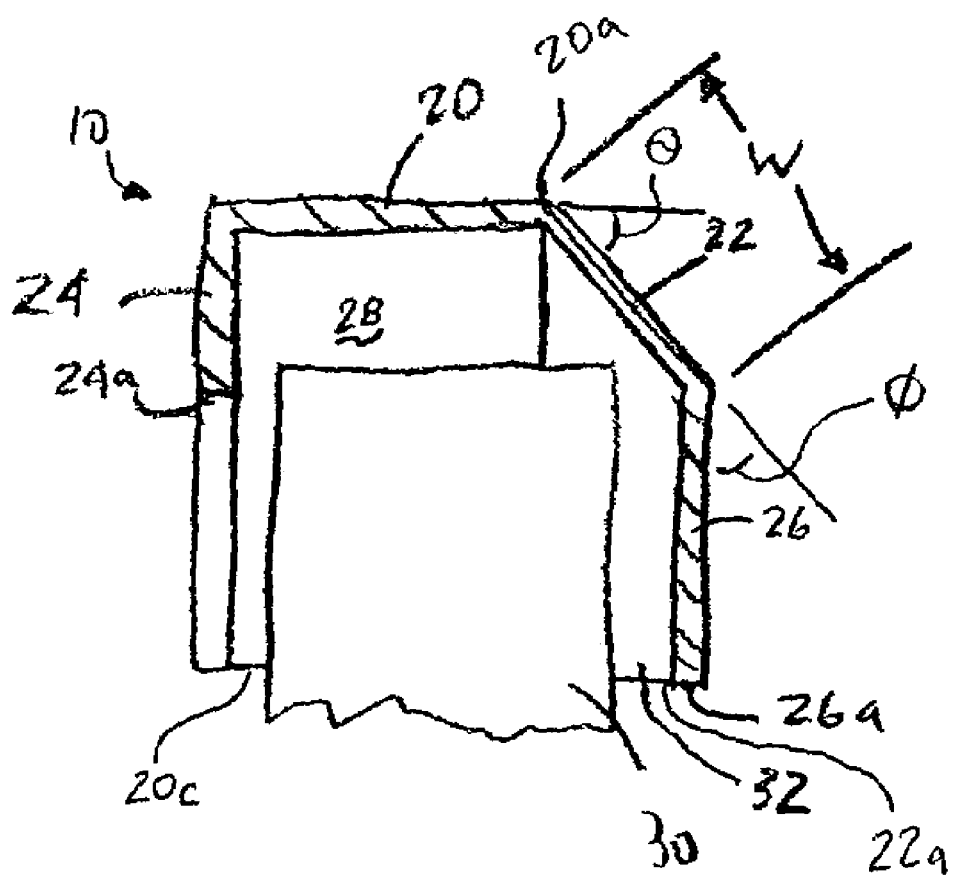
FIG. 7 is a sectional rear elevation of the fender taken along line 5—5 of FIG. 3.
Figure 9:
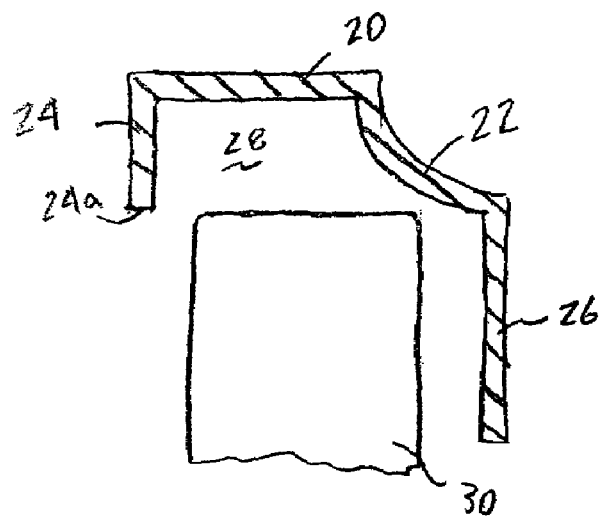
FIG. 9 is a sectional rear elevation of a fender showing a concave clearance increasing portion in accordance with an alternative embodiment of the present invention.

Referring to FIGS. 4–9, the fender 10 is adapted to partially surround at least one tire 30. Preferably, the fender 10 has a top portion 20 that is generally curved in a longitudinal direction to form a concavity in which a wheel and tire assembly 18, 30 is disposed, and substantially flat in a lateral direction to cover a lateral extent of tire 30, as shown in FIGS. 7 and 9. Alternatively, the top portion 20 can be curved in a lateral direction, or the top portion 20 can be planar. The top portion 20 has an inside edge 20a and an outside edge 20b. The light housing 60 is secured to the top portion 20 by conventional securing means such as threaded fasteners, rivets, glue, welding or the like.

The light housing 60 includes a base portion 62 and a raised portion 64 that is adapted to receive a light fixture, as shown in FIG. 8. Preferably, the base portion 62 conforms to the shape of the portion of the fender 10 to which it is secured (preferably, the top portion 20). The raised portion 64 has a generally conical shape. However it should be understood that the raised portion 64 can be any advantageous geometric shape, such as cylindrical, rectangular, square, etc. The raised portion 64 defines an opening 66 in which a lens or the like can be disposed. The raised portion 64 also defines an opening 70 through which wire(s) 72 that electrically connect the light fixture to an energy source extend. Preferably, the light housing 60 is vacuum formed and comprises a plastic, fiberglass, metal or other rigid material. However, the entire fender 10 including the light housing 60 can be formed as one continuous structure.

In an alternative embodiment, the fender can include a raised edge portion 36 as shown in FIG. 8. In this embodiment, the base portion 62 of the light housing 60 includes a corresponding raised edge portion 68 overlapping the raised edge portion 36. The secure fit between the raised edge portions 36 and 68 aids in aligning the light housing 60 when secured to fender 10.

With reference to FIG. 7 and according to a first preferred embodiment, a clearance increasing portion 22 having a width W extends downwardly from the inside edge 20a of the top portion 20 at a non-zero, acute angle θ. Preferably, angle θ is between about 1° and about 89°; more preferably angle θ is between about 40' and about 50°, and most preferably angle θ is 45°. Preferably, the width W of the clearance increasing portion 22 is at least the maximum possible, still leaving necessary clearance for the tire, however, any width W is within the scope of the present invention. Alternatively, the clearance increasing portion 22 may be concave, as shown in FIG. 9, or V-shaped.

Preferably, the fender 10 includes opposed outer and inner vertical walls 24 and 26. The outer vertical wall 24 extends downwardly from the outer edge 20b of the top portion 20 in a generally vertical direction, and the inner vertical wall 26 extends downwardly from the clearance increasing portion 22 in a generally vertical direction. Alternatively, the outer vertical wall 24 and the inner vertical wall 26 can extend at an angle, or can be curved. The fender 10 has defined therein a fender interior 28 adapted to receive at least one tire 30.

The inner vertical wall 26 preferably extends downwardly from the clearance increasing portion 22 in a vertical direction, thereby forming a non-zero acute angle φ between the inner vertical wall 26 and the clearance increasing portion 22 as shown in FIG. 7. It will be appreciated by those skilled in the art that if the top portion 20 and the inner vertical wall 26 are oriented such that they are substantially perpendicular, angles θ and φ add up to approximately 90°.

The elements of fender 10 (the top portion 20, the clearance increasing portion 22, the outer vertical wall 24, and the inner vertical wall 26) preferably are comprised of a rigid material, for example, a metal such as steel or aluminum, a plastic, fiberglass, etc. Also, fender 10 can be formed as one continuous piece, or two or more separate elements can be attached to one another by a conventional attachment method such as welding, fastening with bolts or the like.

Figures 4, 6:
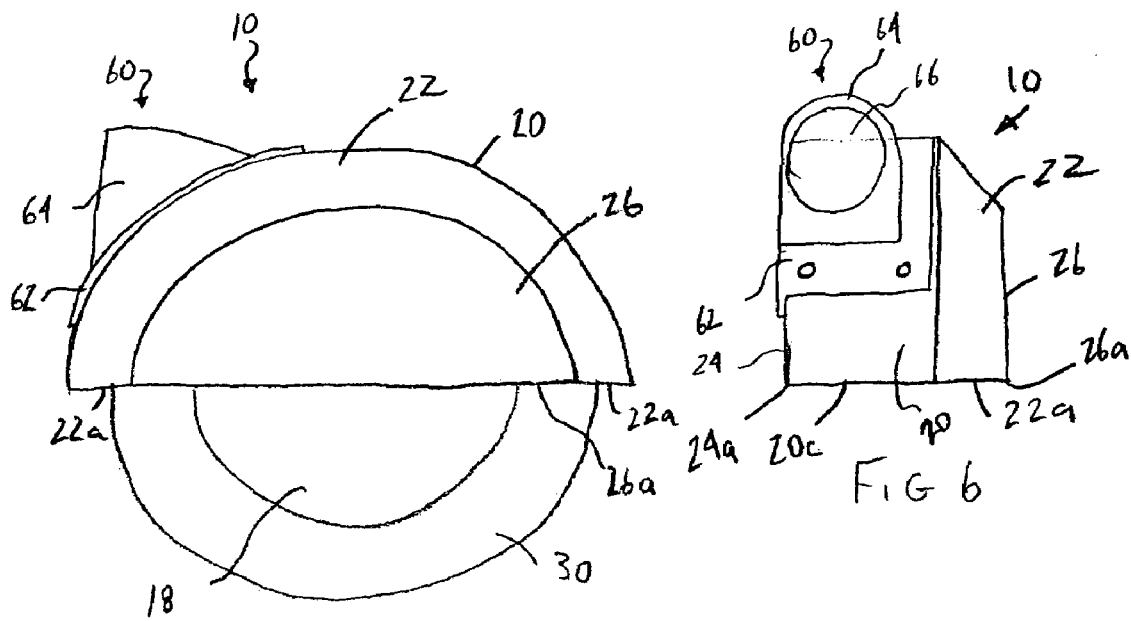
FIG. 4 is a side elevation of a fender including an offset light housing and a clearance increasing portion adapted to partially surround one tire in accordance with a first embodiment of the present invention.
FIG. 6 is a rear elevation of the fender and offset light housing of FIG. 2.

Preferably, the bottom edge 26a of the inner vertical wall 26, the bottom edge 20c of the top portion 20, and the bottom edge 22a of the clearance increasing portion 22 lie in a common plane, thereby defining an opening 32 through which the tire 30 can protrude, as shown in FIGS. 6 and 7. Alternatively, the bottom edge 24a of the outer vertical wall 24 can lie in the same plane as the other bottom edges 20c, 22a and 26a, or the bottom edges 24a, 20c, 22a and 26a can lie in two or more different planes.

Figure 5:
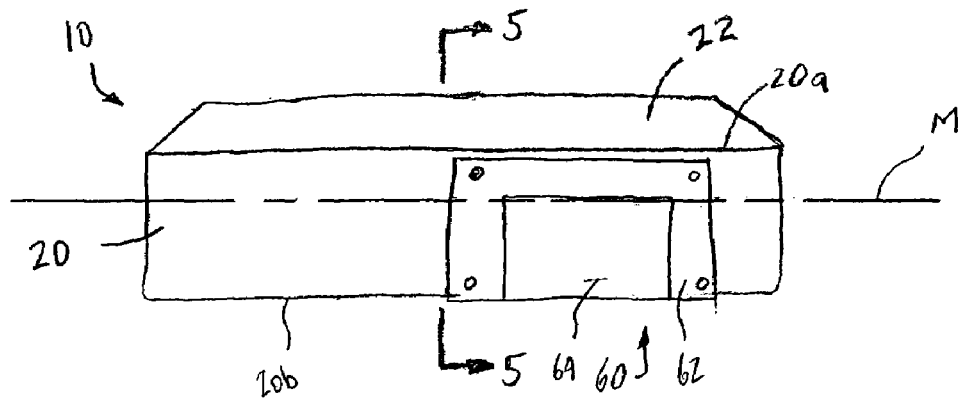
FIG. 5 is a top plan view of the fender and offset light housing of FIG. 2.

The fender 10 defines a bifurcating midline M, as shown in FIG. 5, that runs longitudinally through the fender 10. Preferably, the light housing 60 is mounted in an offset position to the outside of the midline M. That is, the light housing 60 is mounted such that a majority of the raised portion 64 is positioned on the side of the midline M closer to the outside edge 20b of the top portion 20, as shown in FIG. 5, or between midline M and outer edge 20b. Alternatively, the entire light housing 60 can be mounted outside of the outside edge 20b.

It will be appreciated by those skilled in the art that the design configuration of the width W of the clearance increasing portion 22 and the angle θ in combination with the placement of the light housing 60 should preferably be such that the width W2 (FIG. 3) of the object placed on the trailer or tow dolly 12 is maximized, while simultaneously allowing the tire 30 within the fender interior 28 operating room without coming into contact with the inner edge of the clearance increasing portion 22.

Any fender that includes an offset light housing 60 is within the scope of the present invention. It will be appreciated by those skilled in the art that many embodiments having an offset light housing 60 are possible. For example, the fender 10 can omit the inner vertical wall 26 or the outer vertical wall 24, or both, as well as portions thereof. Also, the top portion can be planar or have a U-shaped or bell-shaped cross section, or the entire fender can have a U-shaped or bell-shaped cross section. Also, the fender 10 can include opposed substantially vertical end walls.

Figure 10:
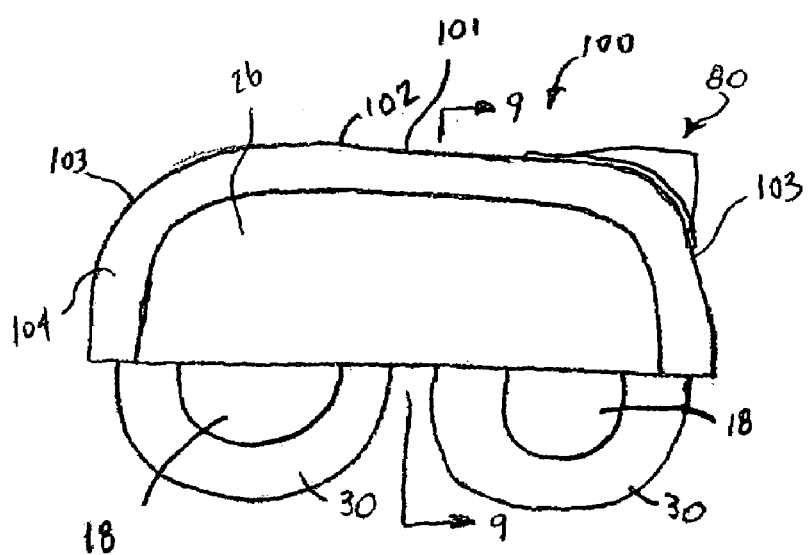
FIG. 10 is a side elevation of a fender including an offset light housing and a clearance increasing portion adapted to partially surround two tires in accordance with a second embodiment of the present invention.
Figure 11:
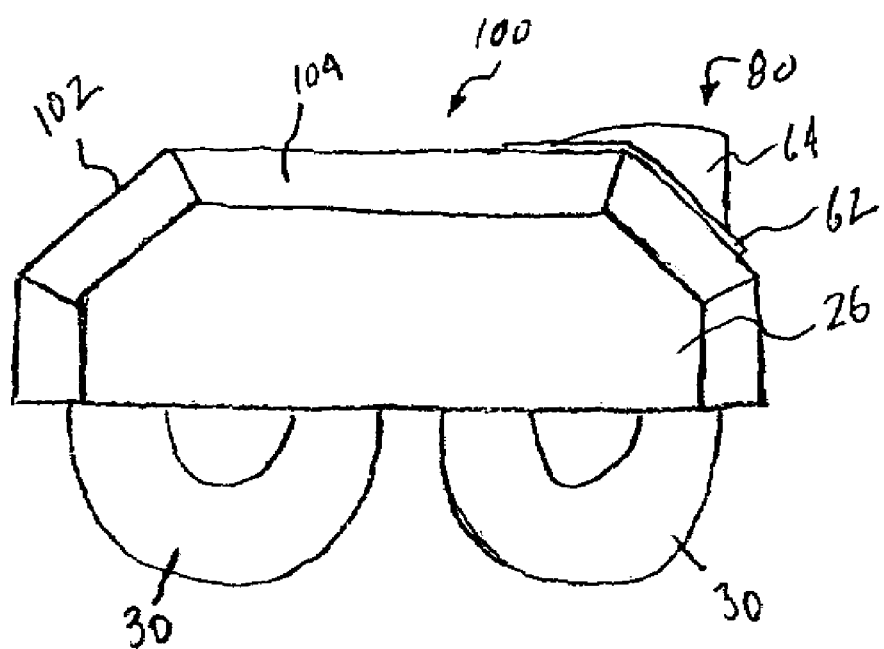
FIG. 11 is a side elevation of an alternative embodiment of the fender of FIG. 8.
Figure 12:
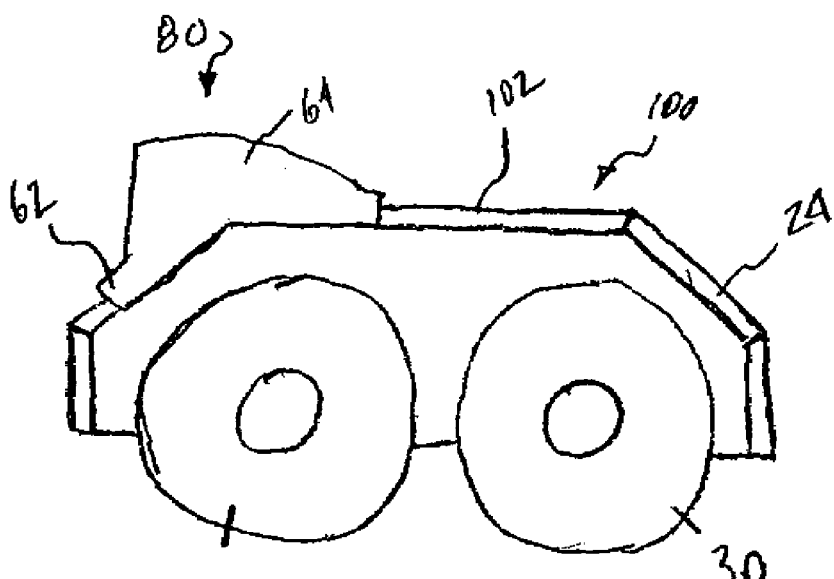
FIG. 12 is a side elevation of an alternative embodiment of the fender of FIG. 8 showing the opposite side of FIG. 9.

A second preferred embodiment is shown in FIGS. 10–12, where same or similar index numbers denote same or similar components as in the first preferred embodiment 10. In this embodiment, a fender 100 is provided for partially surrounding two wheel-mounted tires 30. The fender 100 includes a top portion 102 that preferably has a substantially flat middle section 101 and curved end sections 103, as shown in FIG. 10. Alternatively, the top portion 102 can include a plurality of planar sections that connect at angles, as shown in FIGS. 11 and 12. In this embodiment, the fender includes an offset light housing 80 that is constructed to conform to the shape of fender 100. The fender 100 can also include a clearance increasing portion 104 as shown in FIGS. 8–9, similar to clearance increasing portion 22.

A third preferred embodiment is shown in FIGS. 13–14. In this embodiment, the offset light housing 60 is secured to a conventional fender 140 (a fender without a clearance increasing portion) in a manner similar to that described above.

It should be understood that fenders including an offset light housing that partially surround any number of wheels are within the scope of the present invention. For example, a fender may surround a plurality of wheels rotatably mounted on the same axle or a plurality of wheels rotatably mounted on separate axles.

Figure 15:
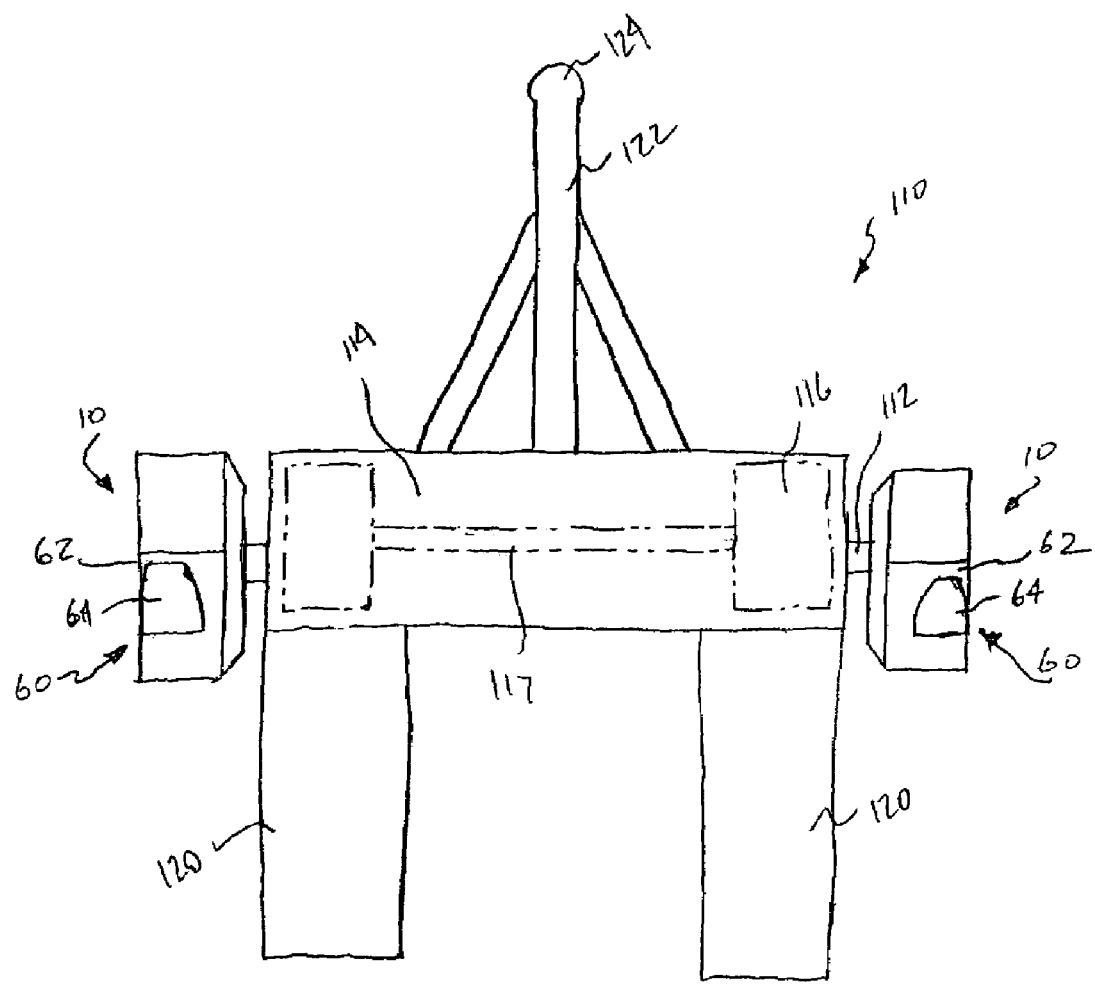
FIG. 15 is a top plan view of a single axle tow dolly having a forwardly positioned platform in accordance with another embodiment of the present invention. The wheel and axle placement of a vehicle to be towed is shown in phantom.
Figure 16:
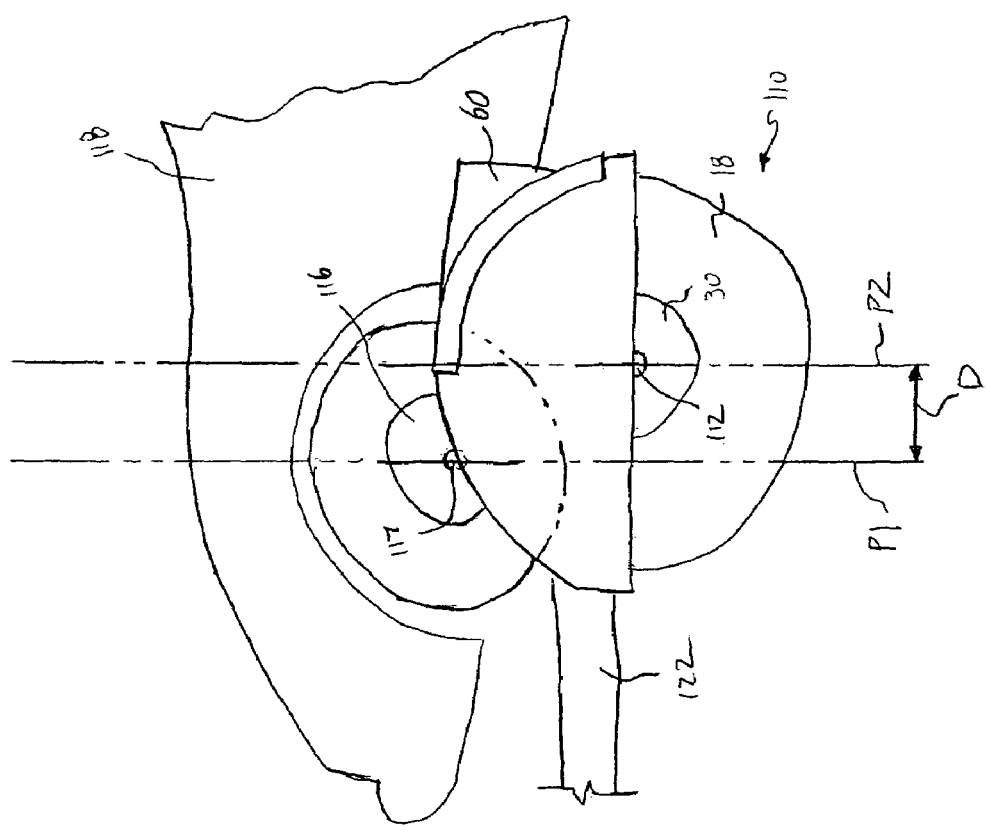
FIG. 16 is an elevational view of the front portion of a vehicle to be towed mounted on the single axle tow dolly of FIG. 13 showing the axle of the vehicle to be towed positioned forwardly of the axle of the tow dolly.

FIGS. 15–16 show yet another embodiment of the present invention. Fender 10 can be included on a tow dolly 110 having a single axle 112 with a pair of wheels 18 (including tires 30) rotatably mounted at the opposite ends of the axle 112. The tow dolly 110 includes a platform/tire tray 114 mounted above the axle 112 on which the front (or rear) tires 116 of a vehicle to be towed 118 are mounted. In FIG. 15, the tires 116 and front axle 117 of the vehicle to be towed 118 are shown in phantom to illustrate their approximate positioning relative to platform 114 and axle 112. A pair of loading ramps 120 extend rearwardly from the platform 114 for driving the front tires 116 of the vehicle to be towed 118 onto the platform 114. A tongue 122 extends forwardly of the axle 112 and the platform 114 to the towing vehicle (not shown). The towing vehicle and tow dolly 110 are typically connected via a hitchball coupler 124. It should be noted that ramps on tow dolly, such as those described above, may or may not be retractable. FIG. 15 illustrates fixed-length tilting ramps that are not retractable. Both types of ramps are common. It should be understood that ramp type is not a limitation on the present invention.

The inclusion of fender 10 having offset light housing 60 thereon allows the platform 114 to be placed in a position wherein the vehicle to be towed 118 can be moved forward relative to its positioning on a conventional tow dolly, as previously described. In a preferred embodiment, this forward positioning of the vehicle to be towed 118 results in the axle 117 of the vehicle to be towed 118 being positioned forward of the axle 112 of the tow dolly 110. That is, with reference to FIG. 16, the vertical plane P1 extending through axle 117 of the vehicle to be towed 118 is spaced forwardly from the vertical plane P2 extending through axle 112 of tow dolly 110 by a distance D. This positioning distributes a portion of the weight of the vehicle to be towed 118 to the hitchball coupler 124, and ultimately to the towing vehicle, thereby minimizing handling problems related to towing. It will be understood that the forward positioning concept can be applied to a tow dolly with multiple axles as well. A skilled artisan will be able to make such a modification.

In a further embodiment, the platform 114 can be narrowed with respect to its longitudinal axis, thereby defining more space between the outer edges of the platform, and the inner edges/surfaces of the fenders 10/tires 30. This arrangement further reduces the possibility of damage to the vehicle to be towed 118 by expanding the space through which the vehicle 118 must pass to come into contact with the fender 10 during a turn or other maneuver. It will be understood that platform 114 is narrowed as compared with conventional platforms of single (or multiple) axle tow dollies.

What is claimed is:

1. A fender comprising:
   a) a top portion having opposed inner and outer edges; and
   b) a clearance increasing portion depending downwardly from said inner edge of said top portion, wherein said clearance increasing portion is concave.

2. A fender comprising:
   a) a top portion having opposed inner and outer edges; and
   b) a clearance increasing portion depending downwardly from said inner edge of said top portion at a first non-zero acute angle, wherein said clearance increasing portion is concave.

3. A fender having a uniform cross-section, the fender comprising:
   a) a top portion having opposed inner and outer edges;
   b) a clearance increasing portion depending downwardly from said inner edge of said top portion at a first non-zero acute angle in a first plane, and
   c) an inner wall depending downwardly from said clearance increasing portion at a second non-zero acute angle in a second plane, wherein said top portion and said inner wall are oriented substantially perpendicularly, and wherein the first and second plane are non-coplanar.

4. A fender having a longitudinal midline and a uniform cross-section, the fender comprising:
   a light housing mounted to the fender offset from the midline;
   a top portion having opposed inner and outer edges;
   a clearance increasing portion depending downwardly from said inner edge of said top portion at a first non-zero acute angle in a first plane, and
   an inner wall depending downwardly from said clearance increasing portion at a second non-zero acute angle in a second plane, wherein said top portion and said inner wall are oriented substantially perpendicularly, and wherein the first and second plane are non-coplanar.

5. A fender having a longitudinal midline, said fender comprising:
   a) a light housing mounted to said fender offset from said midline,
   b) a top portion having opposed inner and outer edges and a bottom edge, wherein said top portion is curved radially downwardly in a longitudinal direction,
   c) a clearance increasing portion having a bottom edge, said clearance increasing portion depending downwardly from said inner edge of said top portion at a non-zero acute angle in a first plane,
   d) an inner wall having a bottom edge, said inner wall depending downwardly from said clearance increasing portion at a non-zero acute angle in a second plane, wherein said top portion and said inner wall are oriented substantially perpendicularly, wherein the first and second planes are non-coplanar and wherein said angle formed by said top portion and said clearance increasing portion, and the angle formed by said clearance increasing portion and said inner wall add up to approximately 90°, and
   e) an outer wall having a bottom edge, said outer wall depending downwardly from said outer edge of said top portion,
      wherein said entire bottom edge of said clearance increasing portion, said entire bottom edge of said inner wall, said entire bottom edge of said top portion and said entire bottom edge of said outer wall all lie in a common plane.

6. A fender having a longitudinal midline, and a light housing mounted to said fender offset from said midline, said fender further comprising
   a) a top portion having opposed inner and outer edges, wherein said light housing is attached to said top portion,
   b) a clearance increasing portion depending downwardly from said inner edge of said top portion at a first non-zero acute angle, wherein said clearance increasing portion is concave, and
   c) an inner wall depending downwardly from said clearance increasing portion at a second non-zero acute angle, wherein said top portion and said inner wall are oriented substantially perpendicularly, and wherein said angle formed by said top portion and said clearance increasing portion, and the angle formed by said clearance increasing portion and said inner wall add up to approximately 90°.

7. The fender of claim 6 wherein said fender has an external surface having a shape, and wherein said light housing comprises a base portion that conforms to at least a portion of the shape of the external surface of fender.

8. The fender of claim 7 wherein the light housing further comprises a raised portion adapted to receive a light fixture.

9. The fender of claim 6 further comprising an outer wall extending downwardly from the outer edge of the top portion.

10. The fender of claim 6 wherein the top portion further comprises a substantially flat middle section and two curved end sections.

11. The fender of claim 6 wherein the top portion comprises a plurality of planar sections.

12. A tow dolly comprising the fender of claim 1.

13. A tow dolly comprising a plurality of fenders of claim 1.

* * * * *